United States Patent
Anerousis et al.

(10) Patent No.: US 10,070,328 B2
(45) Date of Patent: Sep. 4, 2018

(54) PREDICTIVE NETWORK TRAFFIC MANAGEMENT

(71) Applicant: International Business Machines Corporation, Armonk, NY (US)

(72) Inventors: Nikolaos Anerousis, Chappaqua, NY (US); Jinho Hwang, Ossining, NY (US); Jin Xiao, Ossining, NY (US)

(73) Assignee: International Business Mahcines Corporation, Armonk, NY (US)

( * ) Notice: Subject to any disclaimer, the term of this patent is extended or adjusted under 35 U.S.C. 154(b) by 126 days.

(21) Appl. No.: 14/830,964

(22) Filed: Aug. 20, 2015

(65) Prior Publication Data
US 2017/0054641 A1  Feb. 23, 2017

(51) Int. Cl.
*H04J 3/16* (2006.01)
*H04W 24/08* (2009.01)
*H04L 12/911* (2013.01)

(52) U.S. Cl.
CPC ........... *H04W 24/08* (2013.01); *H04L 47/823* (2013.01)

(58) Field of Classification Search
CPC ............. H04L 41/0896; H04L 12/5695; H04L 47/826; H04L 47/127; H04L 47/22; H04L 47/10; H04L 47/125; H04L 47/828; H04L 47/822; H04L 47/823; H04L 7/522; H04L 47/801; H04L 41/147; H04L 47/522
USPC ........... 370/468, 229–332, 395.21, 517–519; 709/223–227; 455/414.2, 452.1, 452.2
See application file for complete search history.

(56) References Cited

U.S. PATENT DOCUMENTS

| | | | |
|---|---|---|---|
| 7,808,903 B2* | 10/2010 | Krishnaswamy | H04L 41/147 370/232 |
| 2013/0215215 A1 | 8/2013 | Gage et al. | |
| 2013/0218846 A1 | 8/2013 | Laredo et al. | |
| 2013/0250770 A1 | 12/2013 | Zou et al. | |
| 2013/0329734 A1 | 12/2013 | Chesla et al. | |
| 2014/0133456 A1 | 5/2014 | Donepudi et al. | |
| 2014/0310517 A1* | 10/2014 | Christodorescu | H04L 41/142 713/160 |
| 2016/0323195 A1* | 11/2016 | Rose | H04L 41/00 |

OTHER PUBLICATIONS

Velasco et al., "In-Operation Network Planning," Advances in Network Planning, IEEE Communications Magazine, Jan. 2014, pp. 52-60.

(Continued)

*Primary Examiner* — Hanh N Nguyen
(74) *Attorney, Agent, or Firm* — Minh-Hien Vo (57) ABSTRACT

Predictive network traffic management in a computer network. Information relating to events likely to have an adverse impact on network traffic, based on predefined parameters of network performance, is collected from the Internet. Details that may be used to predict network traffic density is extracted from the collected events information, and a predicted traffic density, based on the details is generated. Based on the predicted network traffic density, a traffic pattern is generated. A best-matching traffic pattern template to the generated traffic pattern is identified in a store of traffic pattern templates. Based on the best-matching traffic pattern template, bandwidth on the network is provisioned via an SDN controller.

15 Claims, 7 Drawing Sheets

(56) References Cited

OTHER PUBLICATIONS

Su et al., "CheetahFlow: Towards Low Latency Software-Defined Network," IEEE ICC 2014—Next Generation Networking Symposium, Date: Jun. 2014, pp. 3076-3081.
Ferguson et al., "Participatory Networking: An API for Application Control of SDNs," SIGCOMM '13, Aug. 12-16, 2013, pp. 327-338.
Akiyama et al., "Proposal for a New Generation SDN-Aware Pub/Sub Environment," ICN 2014: The Thirteenth International Conference on Networks, Date: Sep. 2014, pp. 210-214.
Araújo, "Traffic re-engineering: Extending resource pooling through the application of re-feedback," A Dissertation submitted for Doctor of Philosophy of University of College London, 2014, pp. 1-128.
Mell et al., "The NIST Definition of Cloud Computing," National Institute of Standards and Technology, U.S Department of Commerce, Special Publication 800-145, Sep. 2011, pp. 1-7.
Yan et al., "Active Learning from Crowds," Proceedings of the 28th International Conference on Machine Learning, Bellevue, WA, USA, 2011, Copyright 2011, pp. 1-8.
Cai et al., "Flow Identification and Characteristics Mining from Internet Traffic with Hadoop," Computer, Information and Telecommunication Systems (CITS), 2014 International Conference, Jul. 7-9, 2014, pp. 1-5.

\* cited by examiner

PREDICTIVE NETWORK TRAFFIC MANAGEMENT

BACKGROUND

The present invention relates generally to the field of computer network management, and more particularly to configuring a software defined network.

In computer networking, network traffic management is the process of managing, controlling, or reducing network traffic, such as Internet bandwidth, e.g., by a network controller. A goal of network traffic management is to reduce congestion, latency, and packet loss. In order to do this effectively, it is necessary to monitor network traffic to determine the causes of network congestion and address such problems.

A local area network (LAN) is a computer network that interconnects computers, typically within a limited area, such as a home, school, or office building, using network media such as twisted-pair cables or wireless. A wide area network (WAN) is a network that covers a broad area, for example, a computer network that crosses metropolitan, regional, national, or international boundaries, typically using leased telecommunication lines. The largest WAN is the Internet.

Software-defined networking (SDN) is an approach to computer networking that allows network administrators to manage network services through abstraction of lower-level functionality. That is, SDN abstracts the underlying infrastructure of the network so it can be treated as a logical or virtual entity. In SDN, control is decoupled from the hardware and given to a software application called an SDN controller. This is done by decoupling the control plane, the system that makes decisions about where traffic is sent, from the forwarding plane, the underlying systems that forward traffic to the selected destination.

Today, around 90% of network traffic goes out to a WAN, e.g., the Internet, while, at one time, 80% stayed in a LAN. Moreover, mobile device use is proliferating. Static deployment of network resources according to predefined workload patterns may be insufficient to meet demands. While software-defined networks are more agile and readily configurable than conventional networks, network configuration is reactive, in that network traffic is monitored and then managed in response to changes in network traffic patterns that occur, for example, when edge routers connecting LANs to a WAN become overloaded. Sudden traffic density shifts and transient surges may result in over-provisioning in some areas causing under-provisioning in others. Hence, a more sophisticated, proactive, approach to network traffic management would be desirable.

SUMMARY

Embodiments of the present invention disclose a computer-implemented method, computer program product, and system for predictive network traffic management in a computer network. Information relating to events likely to have an adverse impact on network traffic, based on predefined parameters of network performance, is collected from the Internet. Details that may be used to predict network traffic density is extracted from the collected events information. A network traffic density prediction, based on the details, is generated. Based on the network traffic density prediction, a traffic pattern is generated. A best-matching traffic pattern to the generated traffic pattern is identified in a store of traffic pattern templates. Based on the best-matching traffic pattern template, bandwidth on the network is provisioned via an SDN controller.

DETAILED DESCRIPTION

Embodiments of the present invention are directed to predictive network traffic management (PNTM) systems, which proactively change the network configuration based on events forecast in online sources such as news, Twitter, or blogs, etc., so that a predictive network traffic management model using techniques from data mining and data analytics may be applied. Such events may include, for example, sporting events, concerts, and congresses with a large number of spectators and/or participants; as well as weddings and other ceremonies that engender a large amount of online traffic in social media. In an exemplary embodiment, Wi-Fi density inference generates data input to an SDN controller for network traffic management at the edge of the network. Wi-Fi density inference refers to predicting locations and levels of demand for wireless network services, for example, by mobile phones or tablets.

Machine learning is a field of computer science and statistics that involves the construction of algorithms that learn from and make predictions about data. Rather than following explicitly programmed instructions, machine learning methods operate by building a model using selected, known inputs, and using the model to make predictions or decisions about unknown inputs. Classification is a machine learning task concerned with the problem of identifying to which of a set of categories, or classes, an input belongs. Applications of classification include spam filtering and optical character recognition. Logistic regression is a common technique for binary classification, in which inputs are assigned to one of two classes, for example, spam or not spam.

In supervised machine learning, a classification function may be inferred, or trained, from a set of labeled training data. The training data consists of training examples, typically pairs of input objects and desired output objects, for example class labels. During training, the parameters of the model are adjusted, usually iteratively, so that inputs are assigned to one or more of the classes to some degree of accuracy, based on a predefined metric. The inferred classification function can then be used to categorize new examples.

Active learning is a form of iterative supervised learning in which a learning algorithm may interactively query a user, or other information source, often referred to as a subject matter expert (SME), to obtain the desired outputs at new data points. This may be advantageous in situations where unlabeled data is abundant, but manually labeling is expensive. In this case, learning algorithms may actively query the user for labels. Since the learning algorithm chooses the examples, the number of examples required to train a machine learning model may be much lower than the number required in normal supervised learning.

In a multi-labeler active learning scenario, multiple SMEs, with varying expertise, are available for querying. In this case, active learning involves choosing both which data sample to label next and which SME to query for labels, in order to optimally train the learning model. Such a model may learn from the SMEs' expertise, even when the expertise may not be consistently accurate, and even if certain data points are labeled only by a subset of the labelers during active learning.

The term network refers to computer networks, such as the Internet, that allow computers to exchange data. Computer networking devices that originate, route, and terminate data are called network nodes. Switches and routers are computer networking devices that allow one or more computers to be connected to other computers, networked devices, or to other networks, with routers typically containing significantly more logic than do switches. Switches and routers use packet switching to receive, process, and forward data packets to a destination device. The term network element (NE) refers to a manageable component of a network, such as a router or a switch, that directly handles data packets and includes logic to direct the flow of data packets.

An edge router is an NE that traditionally routes data between one or more LANs and other outside networks, typically via a backbone network, such as a campus-wide network or a WAN. An edge router is sometimes contrasted with a core router, an NE that generally forwards data packets to computers within a network, but not between networks.

An SDN controller is a software application, or platform on which multiple applications may run, that provides network management services. In an SDN architecture, application program interfaces (APIs) that are used to communicate between an SDN controller and the switches and routers of a network are referred to as southbound APIs. Southbound APIs can be open source or proprietary. OpenFlow™ is an example of an open source southbound API. An example of a proprietary southbound API is onePK™ from Cisco Systems®. All trademarks and registered trademarks used herein are the property of their respective owners. A northbound API in an SDN controller enables applications to program the network and request services from it via the SDN controller. Northbound APIs, typically representational state transfer (REST) APIs, enable basic network functions, such as path computation, loop avoidance, routing, and security. A northbound API presents a network abstraction interface to the applications and management systems in an SDN architecture. The information from these applications is processed and passed along through a southbound API. A number of commercial and/or open source SDN controllers are available, which generally are supplied with both northbound and southbound APIs.

A common method for the control plane in SDN to communicate over a network with the forwarding plane is through the OpenFlow™ V1.4 communications protocol, developed and maintained by the Open Networking Foundation. OpenFlow allows direct access to, and manipulation of, the forwarding plane of NEs, both physical and virtual. OpenFlow enables remote SDN controllers to determine the path of network packets through the NEs. OpenFlow provides a packet forwarding scheme in which a flow table stored in an NE determines where it should forward a data packet. Entries in a flow table, also called flows, specify actions that the NE may take for groups of packets identified by information in the packet header. For example, a flow table entry may specify that certain packets entering via port 1 should be routed to port 2. If no flow corresponding to a packet is found, the packet may be forwarded to the SDN controller, which may add a new flow, specifying how to forward similar packets in the future. Flow table entries typically contain two timeout counters that allow flows to be removed when either a given number of seconds has elapsed or when a given number of seconds without any matching packets has elapsed. In addition, a flow may include a priority, which allows the SDN controller to accommodate multiple actions for the same packet by executing the flow with the highest priority. This provides flexibility and allows for dynamic provisioning of a network in response to changing network demands.

Network virtualization refers to the process of combining hardware and software network resources and functionality into a software-based administrative entity, a virtual network. In a virtual network, resources such as servers and services in a physical network may be pooled, and available bandwidth may be split up into logical channels, which may be accessed independently of the physical components of the network. In particular, an NE in a virtualized network may be a logical, rather than physical entity. While, previously, core NEs were typically not managed dynamically via software, with network virtualization core NEs may also be controlled in an SDN environment.

Figure 1:
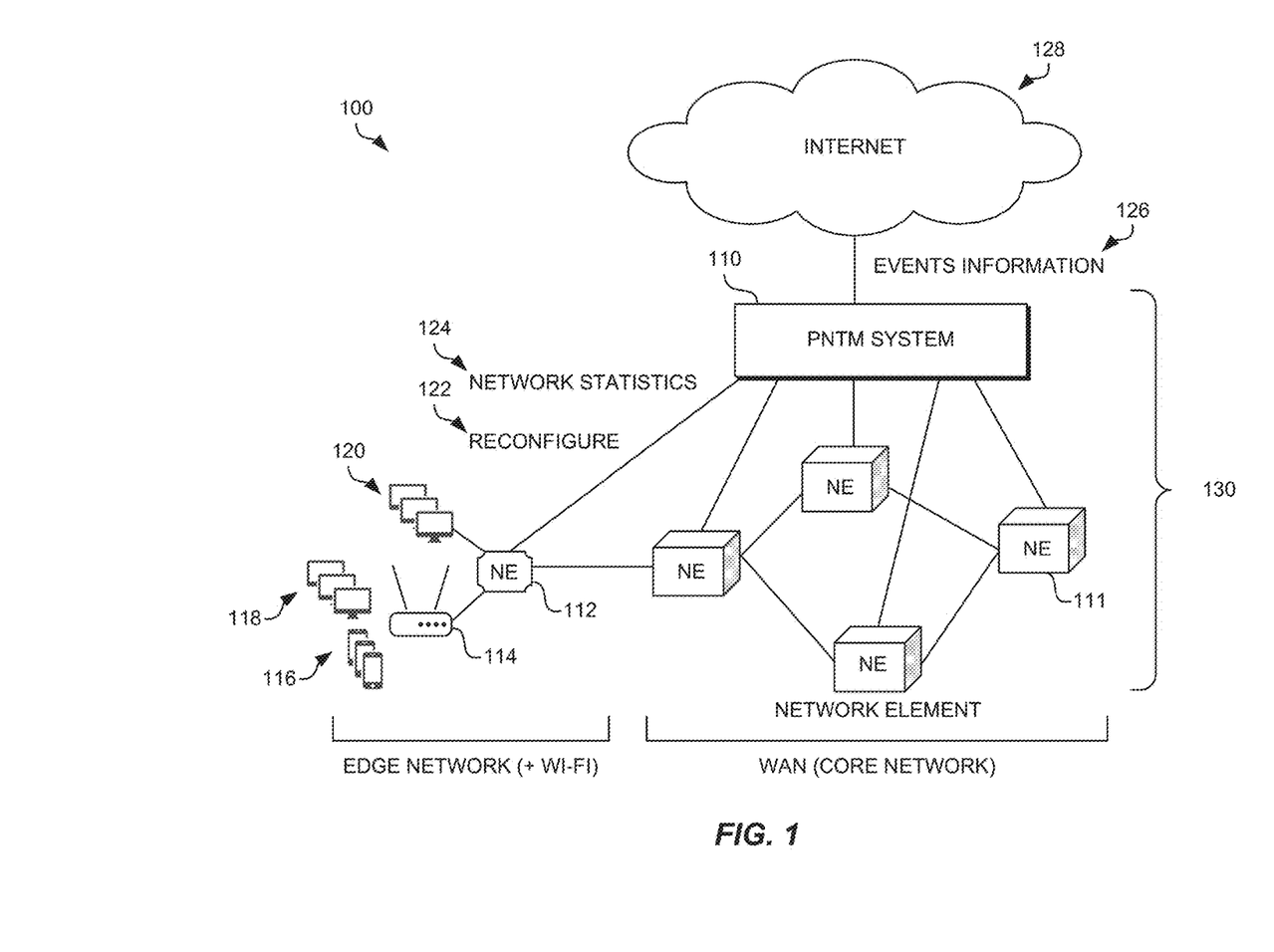
FIG. 1 is a system diagram of a predictive network traffic management (PNTM) environment, in accordance with an embodiment of the present invention.

FIG. 1 is a system diagram of a PNTM environment 100, in accordance with an embodiment of the present invention. PNTM environment 100 includes network 130, which further includes PNTM system 110, core NEs 111, edge NEs 112, wireless routers 114, mobile devices 116, and computing devices 118 and 120. Network 130 may enable access to the Internet 128, for example via an Internet gateway server (not shown).

In an embodiment of the invention, network 130 includes core NEs 111, comprising a WAN, or core network, as well as edge NEs 112 and Wi-Fi routers 114. The WAN of core NEs 111 may be, for example, connected to a data center (not shown). Edge NEs 112 may connect to computing devices 120 in a LAN or to wireless routers 114 connecting via Wi-Fi to computing devices 118 and mobile devices 116. Network 130 may represent, for example, an Internet service provider, a campus data center, a private cloud, or a public cloud. The network media of network 130 can include wired, wireless, or fiber optic connections. In general, network 130 can include any combination of connections and protocols that will support communications between PNTM system 110, NEs 111 and 112, and devices 114, 116, 118, and 120, in accordance with various embodiments of the invention.

In various embodiments of the present invention, network 130 represents an SDN network, which may be at least in part virtualized, that is, various edge NEs 112 and core NEs 111 may include logical nodes, managed for example, by an SDN controller 220, described with reference to FIG. 2, below. For example, SDN controller may employ OpenFlow, as described above, to update flow tables stored in NEs 111 and 112.

In an exemplary embodiment of the invention, PNTM system 110 receives events information 126 from the web, and utilizes SDN to reconfigure 122, and to receive network statistics 124 from, edge NEs 112. PNTM system 110 may also manage and configure core NEs 111, for example, in a virtual network. PNTM system 110 is described in further detail with reference to FIG. 2, below.

Figure 2:
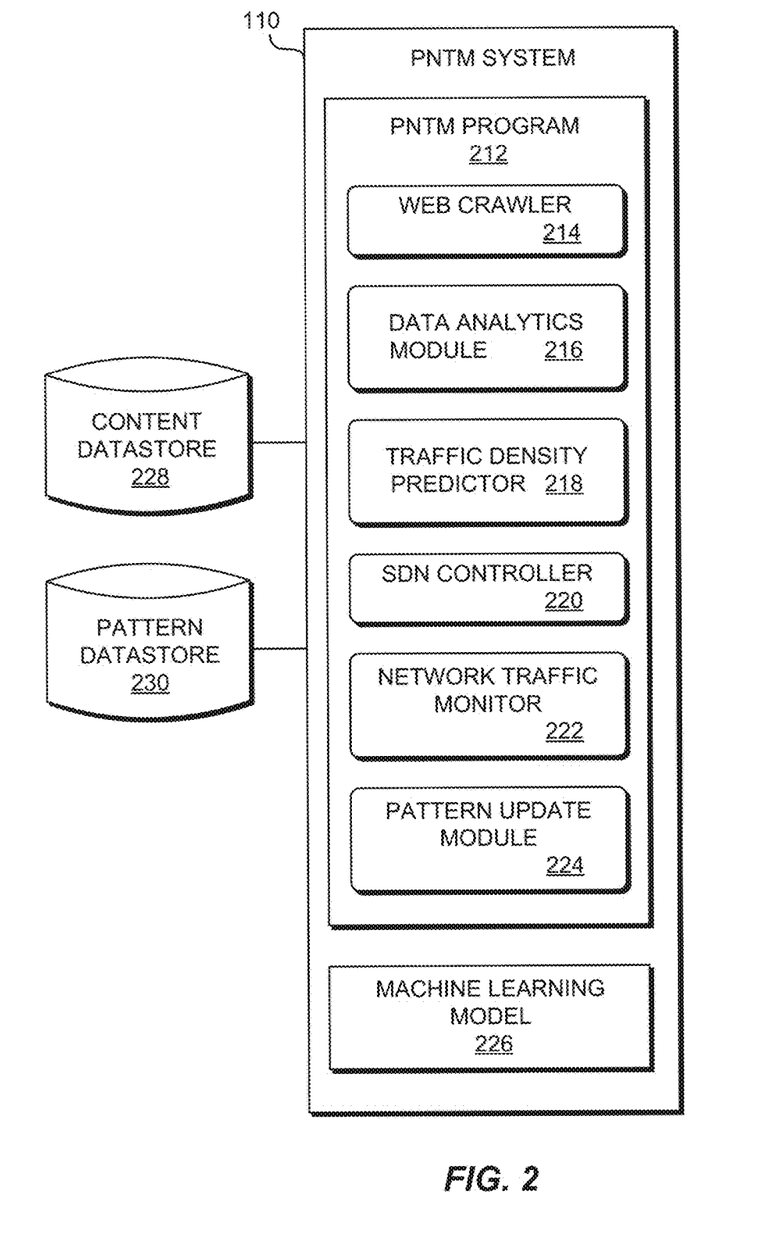
FIG. 2 is a functional block diagram of a PNTM system, in accordance with an embodiment of the present invention.

FIG. 2 is a functional block diagram of a PNTM system 110, in accordance with an embodiment of the invention. PNTM system 110 represents the computing device or platform that hosts PNTM program 212. For example, PNTM system 110 may be integrated in a network gateway server connected to the Internet 128. In various embodiments, PNTM system 110 may be a laptop computer, netbook computer, personal computer (PC), a desktop computer, or any programmable electronic device capable of hosting PNTM program 212, in accordance with embodiments of the invention. PNTM system 110 may include internal and external hardware components, as depicted and described in further detail below with reference to FIG. 4. In other embodiments, PNTM system 110 may be implemented in a cloud computing environment, as described in relation to FIGS. 5, 6, and 7, below.

In an exemplary embodiment of the invention, PNTM system 110 includes PNTM program 212, content datastore 228, pattern datastore 230, and machine learning model 226.

Figure 4:
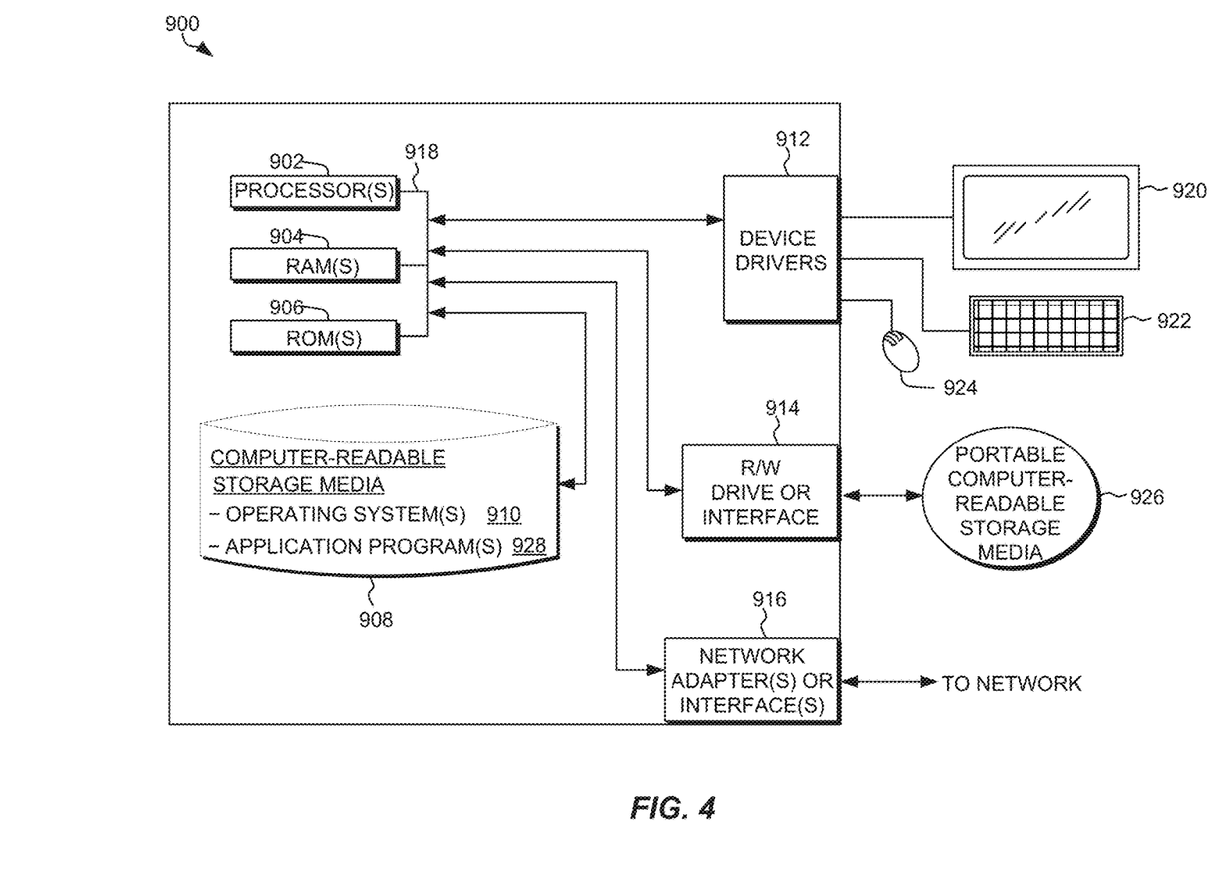
FIG. 4 is a functional block diagram illustrating a data processing environment, in accordance with an embodiment of the present invention.

Content datastore 228 represents a store of web pages crawled from the Internet 128 by web crawler 214, as described in further detail below. Content datastore 228 may reside, for example, on computer readable storage media 908 (FIG. 4).

In an embodiment of the invention, machine learning model 226 may be trained to classify network traffic patterns into classes, where traffic patterns with similar characteristics may be associated with the same class, and each class is represented by a characteristic traffic pattern called a traffic pattern template. Machine learning model 226 may be initially trained, for example, using historical network traffic patterns, including traffic patterns associated with specific events. Machine learning model 226 may subsequently be updated with additional patterns using a multi-labeler active learning algorithm, based on monitored network traffic in network 130 and feedback from SMEs, as described in further detail below. The traffic pattern templates, may be stored, for example, in pattern datastore 230.

Table 1 presents an example implementation of a multi-labeler active learning algorithm, which may be used to train machine learning model 226, in accordance with an embodiment of the invention. The algorithm parameters $\alpha$, $\beta$, $w_1$, . . ., $w_T$, $\gamma$, and C are determined by the active learning model. This model produces a classifier function for predicting the label, or class, z, for example, a class of traffic patterns, for a new instance x, for example, of a traffic pattern, using equation (1), below, and a model of the labelers' expertise as a function of the input x.

TABLE 1

EXAMPLE IMPLEMENTATION OF A
MULTI-LABELER ACTIVE LEARNING ALGORITHM

Inputs: Initial model parameters $\alpha$, $\beta$, $w_1$, . . . , $w_T$, $\gamma$, C, and number of steps K s = 1
while s ≤ K do
    Find the best sample template for data xtem by solving the bi-convex optimization problem:

$$\min_{x,p} C'(\alpha'x + \beta)^2 + p'[w_1, w_2, \ldots, w_T]'x + p'\gamma$$

constrained to:
      C ≥ 0, $p_t$ ≥ 0, $\Sigma_t p_t$ = 1, where p = $[p_1, \ldots, p_T]'$, $\gamma$ = $[\gamma_1, \ldots, \gamma_T]'$ TABLE 1-continued

EXAMPLE IMPLEMENTATION OF A
MULTI-LABELER ACTIVE LEARNING ALGORITHM (C represents a trade-off between the most uncertain points and points labelers are confident in labeling)
Find the nearest point x* to $x_{tem}$
Find the most reliable SME for x*, given the model learned so far, using a logistic function of x* and t:

$\sigma_t(x^*) = (1 + (\exp(-w_t'x^* - \gamma_t))^{-1}$

Retrain the model with new data point x* and label
(i.e., update $\alpha$, $\beta$, $w_1$, . . . , $w_T$, $\gamma$) s = s + 1
end while
Return $\alpha$, $\beta$, $w_T$, $\gamma$ In the multi-labeler active learning algorithm:
1) $x_1$, . . . , $x_n$ are data points, for example, numerically encoded traffic patterns with entries corresponding to location, event size, etc. The points are treated as column vectors in the algorithm.
2) The label for the i-th data point given by labeler t is $y_i^{(t)}$ (e.g., a traffic pattern template).
3) The parameters $\alpha$, $\beta$, $\{w_t\}$, $\{\gamma_t\}$ are estimated via a maximum likelihood criterion.
4) $p_1$, . . . , $p_T$ are logistic probabilities, as described below.
5) (•)' represents the transpose of a column vector or matrix in the algorithm.

The binary logistic model, on which the algorithm presented in Table 1 is based, is used to predict a binary response z, for example, a traffic pattern template, based on one or more predictor variables, or feature vectors, x, for example traffic patterns. The probabilities describing the possible outcomes of a single trial are modeled, as a function of the predictor variables, using a logistic function of the form $$p(z=1|x)=(1+\exp(-\alpha'x-\beta))^{-1} \quad (1)$$

Binary logistic regression refers to the problem in which the dependent variable is binary, that is, the observed outcome for a dependent variable, in this case a label or class, can have only two possible values, for example, "success" or "failure." Logistic regression measures the relationship between the binary dependent variable and one or more independent variables, which are usually continuous, by estimating probabilities related to the logistic function. The algorithm presented in Table 1 is based on a binary logistic model, however, persons of ordinary skill in the art will recognize that multinomial logistic regression may be applied to extend the algorithm to the setting in which more than two outcomes, or classes, are possible.

Pattern datastore 230 represents a store of traffic pattern templates that may be accessed by PNTM program 212, in accordance with an embodiment of the invention. A network traffic pattern or traffic pattern template may include a traffic signature, characterizing an instance of network usage, and a provisioning scheme, which prescribes how to provision network capacity in the event of demands on the network corresponding to the given traffic signature. For example, Table 2 illustrates an example representation of output describing a network traffic pattern in which the traffic signature includes an estimated number of tablet and mobile devices, along with their expected application types (e.g., VoIP or streaming); and a traffic provisioning scheme that generally prescribes bandwidth allocations for core and edge routers and serves as a guide for an SDN controller to devise a more detailed traffic provisioning plan. Pattern datastore 230 may reside, for example, on computer readable storage media 908 (FIG. 4).

TABLE 2

EXAMPLE REPRESENTATION OF OUTPUT DESCRIBING A
NETWORK TRAFFIC PATTERN

```
Pattern =
{ "trafficSignature": [
    { "deviceType": "tablet"
      "estimatedNumberOfDevices": 500
      "expectedApplicationTypes": [
        { "application", "web" },
        { "application", "streaming" },
        { "application", "VoIP" } ] }
    { "deviceType": "mobile",
      "estimatedNumberOfDevices": 1000
      "expectedApplicationTypes": [
        { "application": "web" },
        { "application": "streaming" },
        { "application": "email" } ] }
  ]
  "trafficProvisioningScheme": [
    { "location": "core"
      "avgBandwidth": "6Gb",
      "minBandwidth": "2Gb",
      "maxBandwidth": "10Gb" },
    { "location": "edge"
      "avgBandwidth": "8Gb",
      "minBandwidth": "4Gb",
      "maxBandwidth": "12Gb" }
  ]
}
```

Traffic pattern templates stored in pattern datastore 230, may be represented as feature vectors of the form $z=\{z_1, z_2, \ldots, z_n\}$, where $z_i$ represents the $i^{th}$ of n features, corresponding, for example, to numerically encoded representations of entries such as those shown in the example pattern in Table 2.

In an exemplary embodiment of the invention, PNTM program 212 operates generally to analyze information crawled from the web, in order to predict network traffic density and provision available network bandwidth, so as to anticipate and mitigate traffic bottlenecks and congestion. PNTM program 212 may include web crawler 214, data analytics module 216, traffic density predictor 218, SDN controller 220, network traffic monitor 222, and pattern update module 224.

Web crawling is a data mining technique for automatically collecting, or crawling, information from the web. For this purpose, a web bot, a software application that runs automated tasks over the Internet, is often employed. For example, search engines typically use web bots to visit websites, repeatedly following chains of hyperlinks, in order to keep their indexes of web pages up to date. A variety of proprietary and/or open source web crawlers are available for this purpose. Web crawlers generally either include, or are used in conjunction with, parsers, which extract specific information from the crawled web pages according to pre-defined pattern matching rules.

In an embodiment of the invention, web crawler 214 operates to crawl the Internet 128 to collect events information 126, including news articles, Twitter tweets, blog entries, and social network posts, relating to ongoing or upcoming events likely to have an adverse impact on internet traffic. The determination of what constitutes an adverse impact may be based, for example, on performance guarantees in a service level agreement, or other generally accepted standards of network performance. These standards may be based, for example, on predefined parameters of network performance such as latency, packet loss, and jitter. Such parameters may have target values, for example, of: maximum packet loss from 0% to 0.3%; round-trip end-to-end maximum latency of 30-50 ms; and maximum average jitter of 250 microseconds to 1 ms, with less than 10 ms 99.9% of the time. The events may include, for example, sports events or concerts involving a large number of attendees, who may use social media to report on the experience; inaugurations or similar events that are viewed by a large audience on the web; the initial release of an album or video for download; or a YouTube™ video that goes viral. Web crawler 214 may include a parser, programmed to extract event information 126 from crawled web pages and store the event information in content datastore 228.

Data analytics is the science of examining data for the purpose of drawing conclusions about the information it contains. Data analytics is distinguished from data mining by the scope, purpose and focus of the analysis. While data mining involves sorting through large datasets to identify patterns and uncover relationships, data analytics focuses on inference, the process of deriving conclusions or outcomes from the data, based on what is already known.

Data analytics module 216 operates to receive events information stored in content datastore 228, and infer details about events that may be used to predict network traffic density, in accordance with an embodiment of the invention. The details about an event may include, for example, location, start time, duration, estimated number of attendees or online viewers, and estimated cell phone usage. In particular, data analytics module 216 may analyze the information collected by web crawler 214 to infer Wi-Fi traffic density, which may provide an indication of the level of expected network traffic. Data analytics module 216 may employ for this purpose known techniques from natural language processing (NLP) and machine learning.

Traffic density predictor 218 operates to receive the details about events likely to adversely impact network traffic from data analytics module 216, and use them in conjunction with information on the network topology to predict network traffic flow during such events, in accordance with an embodiment of the invention. Based on the predicted network traffic, traffic density predictor 218 may generate a network traffic pattern for an event and transmit the traffic pattern to pattern update module 224.

Pattern update module 224 may receive a traffic pattern corresponding to a new event, generated by traffic density predictor 218, identify a best-matching traffic pattern template among the templates stored in pattern datastore 230, and return the best-matching traffic pattern template to traffic density predictor 218. For example, a best-matching traffic pattern template may be a template in pattern datastore 230 that best fits the feature vector corresponding to the received pattern.

For example, suppose that the pattern's feature vector is given by $x=\{x_1, x_2, \ldots, x_n\}$, and $z=\{z_1, z_2, \ldots, z_n\}$ represents an existing template, as described above. A best-matching template may be calculated via least squares, by minimizing the quantity $$D(x, z) = \left\| \frac{x_i - z_i}{\sigma_i} \right\|^2$$

where $\sigma_i \in (0,1]$ is a feature weighting or normalizing factor, chosen, for example, to prioritize or scale the entries.

SDN controller 220 is a commercial or open source SDN controller, as described above. In an embodiment of the invention, SDN controller 220 receives a traffic pattern template from traffic density predictor 218 and generates a detailed provisioning plan for provisioning bandwidth to handle the estimated network traffic, based on the traffic signature and traffic provisioning scheme in the traffic pattern template, as well as on knowledge of the network architecture. The provisioning plan may include an effective date and time, as well as routing and bandwidth information for specific core NEs 111 and edge NEs 112. SDN controller 220 may alter the provisioning plan to respond to actual network conditions present while the plan is in effect.

In alternative embodiments of the invention, traffic density predictor 218 may generate a series of network traffic patterns for an event that cover a time span before, during, and after a predicted surge or spike in network traffic, and transmit the series of traffic pattern to pattern update module 224. Pattern update module 224 may receive the series of traffic patterns, identify corresponding best-matching traffic pattern templates in pattern datastore 230, and return them to traffic density predictor 218. Traffic density predictor 218 may receive the traffic pattern templates from pattern update module 224 and generate a detailed provisioning plan for provisioning bandwidth to handle the estimated network traffic before, during, and after the predicted surge or spike.

Network traffic monitor 222 represents an SDN application that monitors network traffic flow and performance in an SDN environment, as part of a dynamic network traffic management system. Network traffic monitor 222 receives information from NEs 111 and 112 (FIG. 1) and collects statistics about traffic density, including, for example, statistics on provisioned versus used bandwidth. Network traffic monitor 222 may identify NEs that are underutilized or overloaded.

Based on information from network traffic monitor 222, SDN controller 220 may adjust network flow and bandwidth allocation to adapt to current network traffic conditions. SDN controller may transmit the traffic pattern resulting from these adjustments to pattern update module 224.

In certain embodiments of the invention, the prediction capabilities of data analytics module 216 and/or traffic density predictor 218 may be improved, based on a comparison of predicted network traffic with experienced network traffic. For example, a machine learning model employed by data analytics module 216 to infer Wi-Fi traffic density may be retrained using the predicted versus the experienced network traffic data.

Pattern update module 224 may retrain machine learning module 226 with a new traffic pattern received from SDN controller 220, and update the store of traffic pattern templates in pattern datastore 230 if the retraining results in changes to the set of existing templates.

Figure 3:
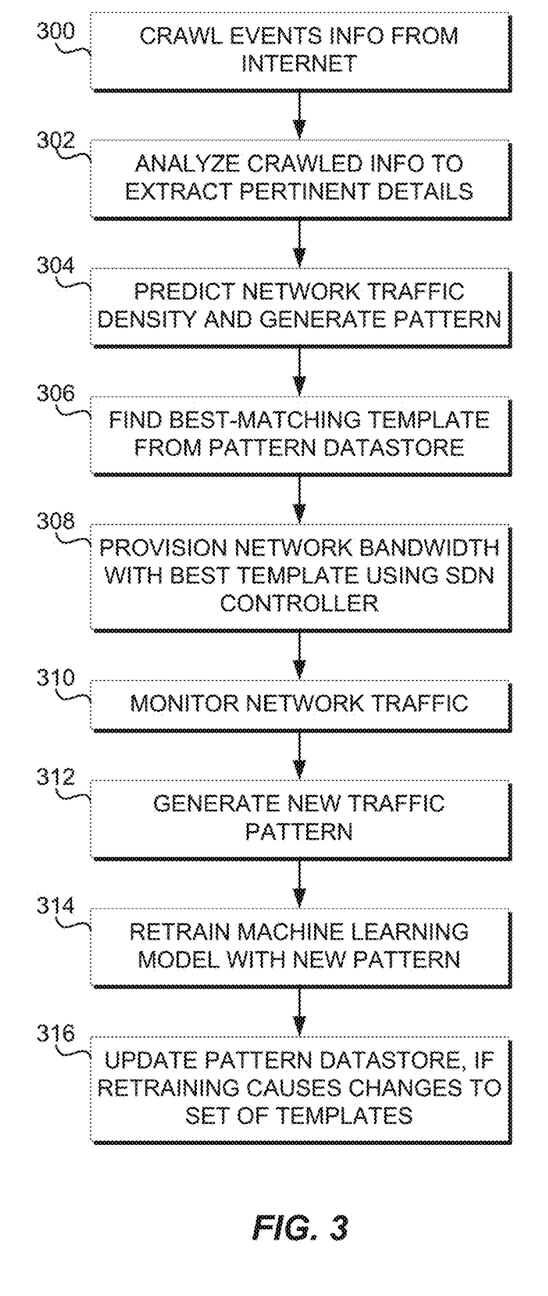
FIG. 3 is a flowchart depicting operational steps of a PNTM program, in accordance with an embodiment of the present invention.

FIG. 3 is a flowchart depicting operational steps of PNTM program 212, in accordance with an exemplary embodiment of the invention. Web crawler 214 crawls information from the Internet on events that are likely to adversely impact network traffic (step 300). Data analytics module 216 analyzes the crawled events information to extract details (step 302) that may be used to predict network traffic density. Based on the details, a network traffic pattern is generated (step 304) and a best-matching template in pattern datastore 230 is identified (step 306). Based on the best-matching template, SDN controller 220 creates a provisioning plan for provisioning network bandwidth (step 308). Network traffic, as provisioned by the provisioning plan, is monitored by network traffic monitor 222 (step 310), including, for example, collecting statistics on provisioned versus used bandwidth. Based on information received from network traffic monitor 222, SDN controller 220 may generate a new traffic pattern (step 312). Machine learning model 226 is retrained with the new traffic pattern (step 314) and pattern update module 224 updates pattern datastore 230 if the retraining results in changes to the set of templates (step 316).

FIG. 4 depicts a block diagram 900 of components of PNTM system 110 (FIG. 2), in accordance with an embodiment of the present invention. It should be appreciated that FIG. 4 provides only an illustration of one implementation and does not imply any limitations with regard to the environments in which different embodiments may be implemented. Many modifications to the depicted environment may be made.

PNTM system 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, PNTM program 212 (FIG. 2), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

PNTM system 110 may also include a R/W drive or interface 914 to read from and write to one or more portable computer readable storage media 926. Application programs 928 on PNTM system 110 may be stored on one or more of the portable computer readable storage media 926, read via the respective R/W drive or interface 914 and loaded into the respective computer readable storage media 908.

PNTM system 110 may also include a network adapter or interface 916, such as a TCP/IP adapter card or wireless communication adapter (such as a 4G wireless communication adapter using OFDMA technology). Application programs 928 on PNTM system 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

PNTM system 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
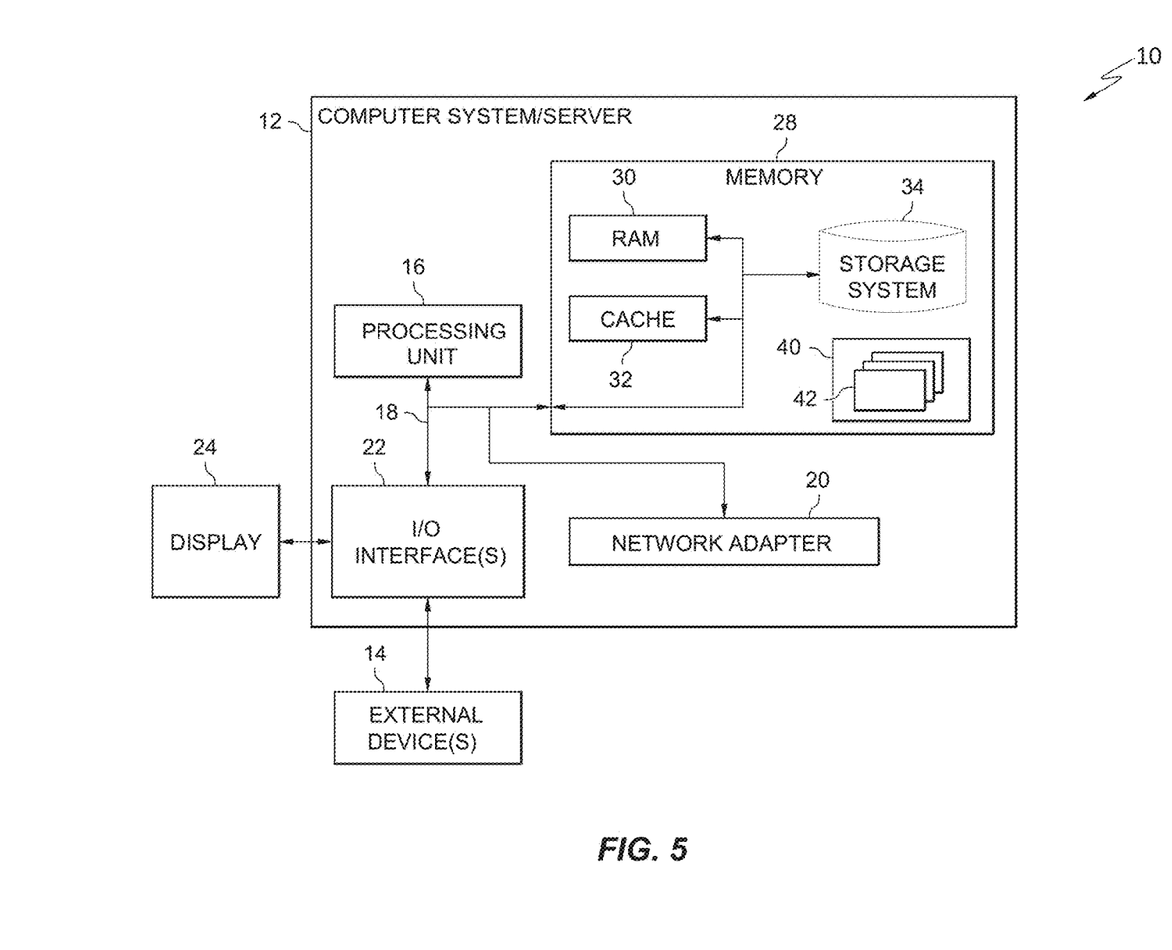
FIG. 5 is a functional block diagram of a cloud computing node according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
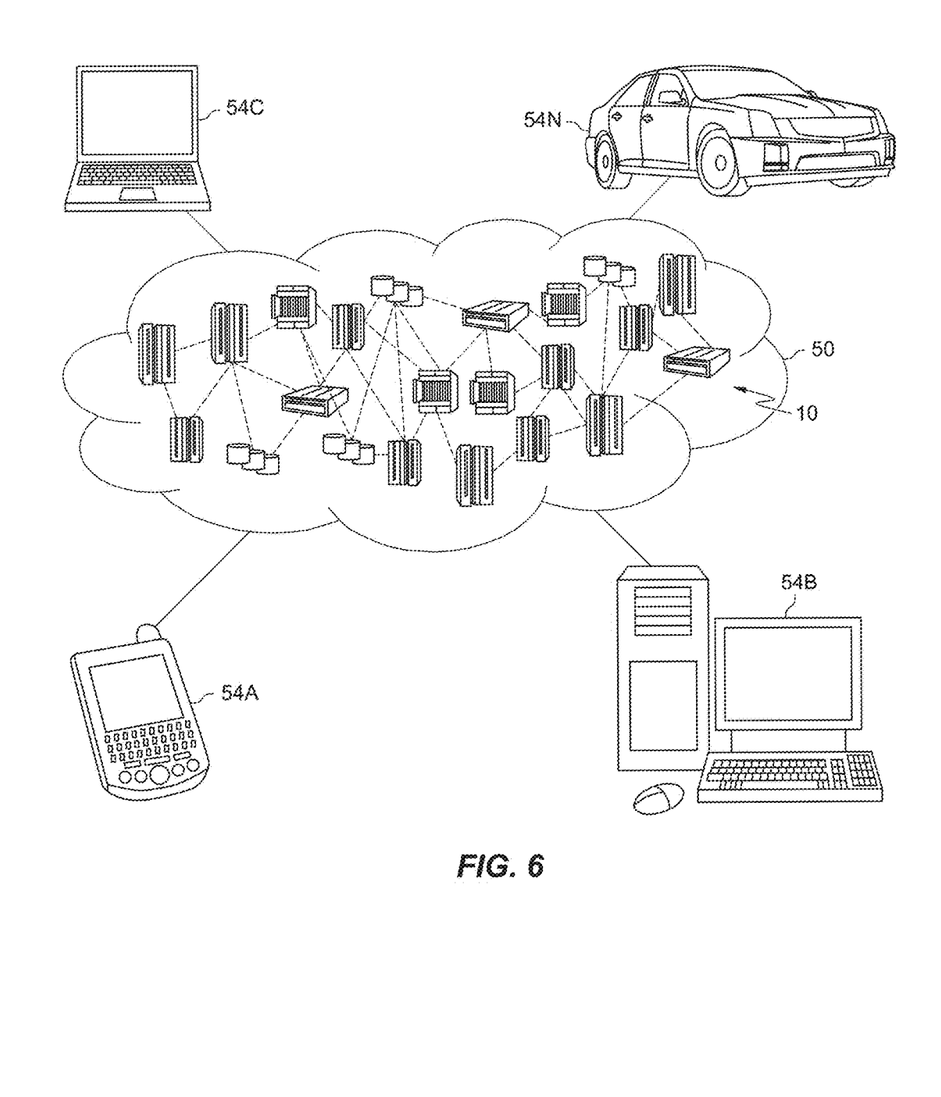
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
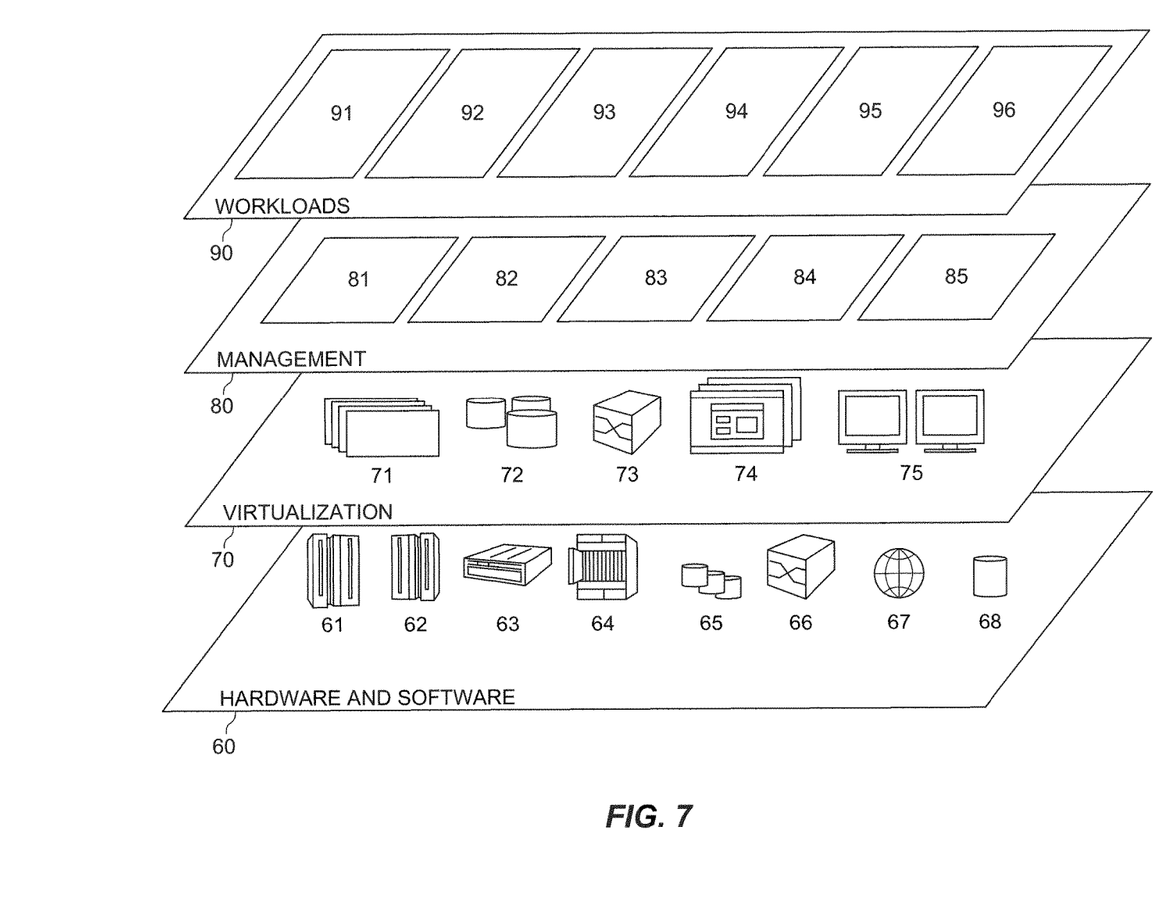
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and PNTM program 96.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer-implemented method for predictive network traffic management in a computer network, the method comprising:
   collecting, by a computer from the Internet, information relating to events that adversely impacts network traffic in the computer network based on predefined parameters of network performance, wherein the information is collected from each of a news article, a microblog entry, a blog entry, and a social network post;
   extracting, by the computer, details used to predict network traffic density based on the collected events information;
   generating, by the computer, a predicted network traffic pattern based on the extracted details;
   generating, by the computer, a traffic pattern based on a predicted network traffic density;
   identifying, by the computer, in a store of traffic pattern templates, a best-matching traffic pattern template to the generated traffic pattern, wherein identifying the best-matching traffic pattern template comprises representing traffic patterns as numerically encoded feature vectors and using a least squares method; and
   allocating, by the computer, bandwidth on the network, via a software defined network (SDN) controller, based on the best-matching traffic pattern template, wherein the bandwidth is allocated with respect to an edge router of the network based on each of a determined number of devices connected to the edge router and a determined type of each of the connected devices.

2. A method in accordance with claim 1, wherein collecting, by the computer from the Internet, information relating to events that adversely impact network traffic in the computer network comprises using a web bot, programmed to crawl the Internet.

3. A method in accordance with claim 1, further comprising using a machine learning model to classify, by the computer, traffic patterns into a plurality of classes, each class being represented by a traffic pattern template, and storing, by the computer, the traffic pattern templates in the store of traffic pattern templates.

4. A method in accordance with claim 3, wherein using a machine learning model to classify traffic patterns into classes comprises using a multi-labeler active learning algorithm.

5. A method in accordance with claim 3, further comprising:
   monitoring, by the computer, network traffic as allocated by the SDN controller;
   generating, by the computer, a new traffic pattern, based on the monitored network traffic and user feedback;
   retraining, by the computer, the machine learning model with the new traffic pattern; and
   in response to the retraining resulting in a change to the stored traffic patterns, updating, by the computer, the store of traffic pattern templates.

6. A computer program product for predictive network traffic management in a computer network, the computer program product comprising:
   one or more non-transitory computer-readable storage media and program instructions stored on the one or more non-transitory computer-readable storage media for execution by at least one or more processors of a computer system, the program instructions, when executed by the at least one or more processors, causing the computer system to perform a method comprising:
   collecting, by the computer system from the Internet, information relating to events that adversely impacts network traffic in the computer network based on predefined parameters of network performance, wherein the information is collected from each of a news article, a microblog entry, a blog entry, and a social network post;
   extracting, by the computer system, details used to predict network traffic density based on the collected events information;
   generating, by the computer system, a predicted network traffic pattern based on the extracted details;
   generating, by the computer system, a traffic pattern based on a predicted network traffic density;
   identifying, by the computer system, in a store of traffic pattern templates, a best-matching traffic pattern template to the generated traffic pattern, wherein identifying the best-matching traffic pattern template comprises representing traffic patterns as numerically encoded feature vectors and using a least squares method; and
   allocating, by the computer system, bandwidth on the network, via a software defined network (SDN) controller, based on the best-matching traffic pattern template, wherein the bandwidth is allocated with respect to an edge router of the network based on each of a determined number of devices connected to the edge router and a determined type of each of the connected devices.

7. A computer program product in accordance with claim 6, wherein collecting, by the computer system from the Internet, information relating to events that adversely impact network traffic in the computer network comprises using a web bot, programmed to crawl the Internet.

8. A computer program product in accordance with claim 6, the method further comprising using a machine learning model to classify traffic patterns into a plurality of classes, each class being represented by a traffic pattern template, and storing the traffic pattern templates in the store of traffic pattern templates.

9. A computer program product in accordance with claim 8, wherein using a machine learning model to classify traffic patterns into classes comprises using a multi-labeler active learning algorithm.

10. A computer program product in accordance with claim 8, the method further comprising:

monitoring, by the computer system, network traffic as allocated by the SDN controller;

generating, by the computer system, a new traffic pattern, based on the monitored network traffic and user feedback;

retraining, by the computer system, the machine learning model with the new traffic pattern; and in response to the retraining resulting in a change to the stored traffic patterns, updating, by the computer system, the store of traffic pattern templates.

11. A computer system for predictive network traffic management in a computer network, the computer system comprising:

one or more computer processors, one or more non-transitory computer-readable storage media, and program instructions stored on one or more of the non-transitory computer-readable storage media for execution by at least one of the one or more processors, the program instructions, when executed by the at least one or more processors, causing the computer system to perform a method comprising:

collecting, by the computer system from the Internet, information relating to events that adversely impacts network traffic in the computer network based on predefined parameters of network performance, wherein the information is collected from each of a news article, a microblog entry, a blog entry, and a social network post;

extracting, by the computer system, details used to predict network traffic density based on the collected events information;

generating, by the computer system, a predicted network traffic pattern based on the extracted details;

generating, by the computer system, a traffic pattern based on a predicted network traffic density;

identifying, by the computer system, in a store of traffic pattern templates, a best-matching traffic pattern template to the generated traffic pattern, wherein identifying the best-matching traffic pattern template comprises representing traffic patterns as numerically encoded feature vectors and using a least squares method; and allocating, by the computer system, bandwidth on the network, via a software defined network (SDN) controller, based on the best-matching traffic pattern template, wherein the bandwidth is allocated with respect to an edge router of the network based on each of a determined number of devices connected to the edge router and a determined type of each of the connected devices.

12. A computer system in accordance with claim 11, wherein collecting, by the computer system from the Internet, information relating to events that adversely impact network traffic in the computer network comprises using a web bot, programmed to crawl the Internet.

13. A computer system in accordance with claim 11, the method further comprising using a machine learning model to classify traffic patterns into a plurality of classes, each class being represented by a traffic pattern template, and storing the traffic pattern templates in the store of traffic pattern templates.

14. A computer system in accordance with claim 13, wherein using a machine learning model to classify traffic patterns into classes comprises using a multi-labeler active learning algorithm.

15. A computer system in accordance with claim 13, the method further comprising:

monitoring, by the computer system, network traffic as allocated by the SDN controller;

generating, by the computer system, a new traffic pattern, based on the monitored network traffic and user feedback;

retraining, by the computer system, the machine learning model with the new traffic pattern; and in response to the retraining resulting in a change to the stored traffic patterns, updating, by the computer system, the store of traffic pattern templates.

* * * * *